US012672730B2

(12) United States Patent
Tanaka

(10) Patent No.: US 12,672,730 B2
(45) Date of Patent: Jul. 7, 2026

(54) STRAW AND MANUFACTURING METHOD OF STRAW

(71) Applicant: TANAX, INC., Kyoto (JP)

(72) Inventor: Ippei Tanaka, Kyoto (JP)

(73) Assignee: TANAX, INC., Kyoto (JP)

( * ) Notice: Subject to any disclaimer, the term of this patent is extended or adjusted under 35 U.S.C. 154(b) by 1097 days.

(21) Appl. No.: 17/417,319

(22) PCT Filed: Oct. 29, 2019

(86) PCT No.: PCT/JP2019/042422
§ 371 (c)(1),
(2) Date: Jun. 22, 2021

(87) PCT Pub. No.: WO2020/137138
PCT Pub. Date: Jul. 2, 2020

(65) Prior Publication Data
US 2022/0071422 A1 Mar. 10, 2022

(30) Foreign Application Priority Data
Dec. 26, 2018 (JP) ................................ 2018-243627

(51) Int. Cl.
*A47G 21/18* (2006.01)
*A47G 19/22* (2006.01)
(Continued)

(52) U.S. Cl.
CPC ........... *A47G 21/18* (2013.01); *B31D 5/0095* (2013.01); *B65D 77/28* (2013.01); *A47G 19/22* (2013.01)

(58) Field of Classification Search
CPC ...... A47G 21/18; A47G 19/22; B31D 5/0095; B65D 77/28
(Continued)

(56) References Cited

U.S. PATENT DOCUMENTS 2,576,864 A * 11/1951 Valente ................... B32B 27/00 156/215
3,034,905 A * 5/1962 Weintraub ................ B65B 7/14 53/469
(Continued)

FOREIGN PATENT DOCUMENTS

JP 2003-231557 A 8/2003
JP 2005-046237 A 2/2005
(Continued)

OTHER PUBLICATIONS

Jan. 21, 2020 International Search Report issued in International Patent Application No. PCT/JP2019/042422.
(Continued)

*Primary Examiner* — Shelley M Self
*Assistant Examiner* — Katie L Gerth
(74) *Attorney, Agent, or Firm* — Oliff PLC

(57) ABSTRACT

A manufacturing method of a straw includes: overlapping a first sheet material in which a plurality of straight linear crest portions and straight trough portions are alternately arranged and a second sheet material facing the first on the crest portion side; forming a closed space between the trough portion and the second sheet material by joining the first and second sheet materials at the crest portion of the first sheet material; and a plurality of straws are obtained by cutting a joined part. A straw obtained by the method includes: a first member having a linear recessed portion and flange portions positioned on both sides of the linear recessed portion and extending along the linear recessed portion; and a sheet-like second member facing the first member, in which the first member and the second member are joined at the flange portion of the first member.

10 Claims, 9 Drawing Sheets

(51) Int. Cl.
*B31D 5/00* (2017.01)
*B65D 77/28* (2006.01)

(58) Field of Classification Search
USPC .......................................................... 493/269
See application file for complete search history.

(56) References Cited

U.S. PATENT DOCUMENTS

| | | | | | |
|---|---|---|---|---|---|
| 4,086,116 | A * | 4/1978 | Yazaki | B31F 1/2804 156/205 |
| 4,679,474 | A * | 7/1987 | Lambrecht | B26D 7/10 493/227 |
| 4,702,731 | A * | 10/1987 | Lambrecht | B31B 70/00 493/196 |
| 5,611,627 | A * | 3/1997 | Belias | B65D 33/1608 383/77 |
| 5,816,993 | A * | 10/1998 | Fowler | B65D 33/06 493/926 |
| 6,651,694 | B1 * | 11/2003 | Krenzel | A45C 11/00 224/148.2 |
| 2005/0258222 | A1 * | 11/2005 | Hewitt | B31B 50/84 493/58 |
| 2006/0141215 | A1 * | 6/2006 | Jonsson | E04C 2/20 428/156 |
| 2009/0255205 | A1 * | 10/2009 | Noble | B32B 21/10 52/630 |
| 2019/0380520 | A1 * | 12/2019 | Wan | A47G 21/18 |
| 2021/0337993 | A1 * | 11/2021 | Koskinen | A47G 21/18 |

FOREIGN PATENT DOCUMENTS

| | | | |
|---|---|---|---|
| JP | 2009-233348 | A | 10/2009 |
| JP | 3218847 | U | 11/2018 |
| WO | WO-2020019096 | A1 * | 1/2020 |

OTHER PUBLICATIONS

Jan. 21, 2020 Written Opinion of the International Searching Authority issued in International Patent Application No. PCT/JP2019/042422.

* cited by examiner

STRAW AND MANUFACTURING METHOD OF STRAW

TECHNICAL FIELD

The present invention relates to a straw and a manufacturing method of the straw, and more particularly, relates to a paper straw and a manufacturing method of the straw.

BACKGROUND ART

In fast food restaurants, cold beverages such as juice and iced coffee are usually served in disposable cups with straws. Disposable cups include plastic or paper cups, and plastic cups have conventionally been used widely because plastic cups are stronger and less expensive than paper cups.

Plastic products in general, including plastic cups, are disposed of and then incinerated or recycled. However, since plastic products and other products (e.g., paper products) have different incineration and recycling treatment methods, plastic products have to be collected separately from other products, and the collection work takes time and effort. Moreover, plastic products are higher than other products in cost for incineration treatment and recycling treatment. In recent years, a large amount of fine plastics (microplastics) are generated by decomposition of illegally dumped plastic products, and various environmental problems caused by the fine plastics floating on the ocean have become apparent.

Therefore, many fast food restaurants stop using plastic cups and are replacing the plastic cups with paper cups, which are relatively easy to recycle and incinerate and have less environmental load. On the other hand, although paper straws are provided (see Patent Literatures 1 and 2), many plastic straws are still used because of the high manufacturing cost and material cost of paper straws.

CITATION LIST

Patent Literature

Patent Literature 1: JP 2009-233348 A
Patent Literature 2: JP 3218847 U

SUMMARY OF INVENTION

Technical Problem

An object of the present invention is to provide a straw with low manufacturing cost and low material cost

Solution to Problem

A manufacturing method of a straw according to the present invention made to solve the above problems includes:

- overlapping a first sheet material in which a plurality of linear crest portions and a plurality of trough portions are alternately arranged and a second sheet material facing the first sheet material on a crest portion side of the first sheet material;
- joining the first sheet material and the second sheet material at the plurality of linear crest portions of the first sheet material to form a plurality of closed spaces between the plurality of trough portions and the second sheet material; and
- cutting a plurality of joined parts to obtain a plurality of straws.

In the manufacturing method of the straw according to the present invention, the "sheet material in which a plurality of linear crest portions and a plurality of trough portions are alternately arranged" is typically a corrugated sheet material. Since the corrugated sheet has a shape in which the trough portion and the crest portion are symmetrical, trough portions and linear crest portions when viewed from one side become linear crest portions and trough portions, respectively, when viewed from the other side. Therefore, the side for joining the second sheet material to the first sheet material is not limited, providing the excellent handleability. However, the crest portions and trough portions of the first sheet material may not necessarily be symmetrical.

According to the manufacturing method of the straw described above, a straw having a closed space is formed from a trough portion of the first sheet material, a part of linear crest portions positioned on both sides of the trough portion, and a part of the second sheet material corresponding to these. In this straw, the beverage is sucked up from the closed space.

In the manufacturing method of the straw described above, it is preferable that the second sheet material has a plurality of linear crest portions and a plurality of trough portions arranged at the same pitch as those of the first sheet material, and the plurality of linear crest portions of the first sheet material and the plurality of linear crest portions of the second sheet material are joined.

According to the above configuration, a closed space is formed between a trough portion of the first sheet material and a trough portion of the second sheet material. Therefore, the closed space has a substantially circular cross-sectional shape if a trough portion of the first sheet material and that of the second sheet material are semicircular in cross section, and the closed space has a substantially square cross-sectional shape if the trough portions are rectangular in cross section.

In the manufacturing method of the straw described above, the second sheet material may have a flat shape.

In this configuration, a part of the closed space is flat, but it is possible to easily join the liner crest portions of the first sheet material and the second sheet material. Since the width of a trough portion (interval (pitch) of the linear crest portions) of the first sheet material is fixed by the second sheet material and does not expand, the closed spaces do not flatten after the both sheet materials are joined.

In the manufacturing method of the straw described above, it is preferable that the part where the first sheet material and the second sheet material are joined is cut along a curved cutting line. The curved cutting line in this case may be any curve as long as it does not protrude from the joined part, and for example, a gentle sine curve having a period larger than the amplitude, a sine curve having an amplitude and a period that are both small, a free curve, and the like are conceivable. No matter what curve the cutting line is, the cut lines of the first and second sheet materials formed on the both sides of the obtained straw become curved lines, and hence the fingers and the inside of the mouth are hardly damaged by the cut lines.

In the manufacturing method of the straw described above, it is preferable that the part where the first sheet material and the second sheet material are joined is cut along a cutting line including a straight line portion and a Y-shaped portion at one end or both ends of the straight line portion. According to this method, it is possible to obtain a straw having no corners at one end or both ends.

In the manufacturing method of the straw described above, the first and second sheet materials are preferably made of cup base paper having a basis weight of 50 g/$m^2$ to 500 g/$m^2$. This gives a strong, hard-to-break straw having a comfortable oral texture and an appropriate thickness (thinness).

A straw according to the present invention made to solve the above problem has:

- a strap-like first member having a linear recessed portion and flange portions positioned on both sides of the linear recessed portion and extending along the linear recessed portion; and
- a strap-like second member facing the first member and joined at the flange portions of the first member.

The straw according to the present invention can be manufactured by the manufacturing method of the straw described above. In this case, the linear recessed portion of the first member corresponds to the trough portion of the first sheet member, and the flange portions of the first member corresponds to a part of the crest portions of the first sheet material.

In the straw according to the present invention, the second member may have a flat shape.

The second member has a linear recessed portion and flange portions positioned on both sides of the linear recessed portion and extending along the linear recessed portion, and the flange portions of the second member may be joined to the flange portions of the first member. In this case, the linear recessed portion of the first member and the linear recessed portion of the second member may have the same shape or may have different shapes. The depth of one linear recessed portion may be smaller than the depth of the other linear recessed portion.

In the straw described above, the first member and the second member are preferably made of cup base paper having a basis weight of 50 g/$m^2$ to 500 g/$m^2$.

Advantageous Effects of Invention

According to the present invention, it is possible to provide a straw with low manufacturing cost and low material cost.

DESCRIPTION OF EMBODIMENTS

A straw and a manufacturing method of the straw according to the present invention will be described below with specific embodiments.

First Embodiment

Figure 1:
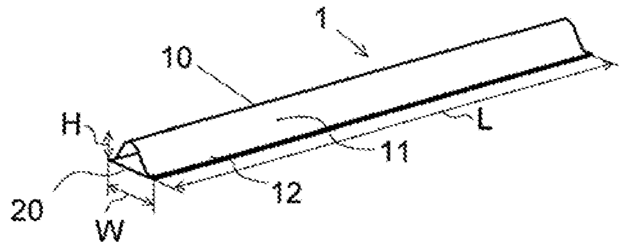
FIG. 1 is a perspective view of a straw according to a first embodiment of the present invention.

FIG. 1 is a perspective view of the straw according to the first embodiment of the present invention. A straw 1 includes an elongated paper strip 10 having a linear recessed portion 11 having a crest-shaped cross section and flange portions 12 on both sides of the linear recessed portion 11, and an elongated paper strip 20 having a flat shape. The paper strip 10 corresponds to the first member of the present invention and the paper strip 20 corresponds to the second member of the present invention.

The paper strip 10 and the paper strip 20 have the same length (denoted by a symbol L in FIG. 1) and the same width (denoted by a symbol W in FIG. 1), and both of the paper strips 10 and 20 are joined at a flange portion 12 of the paper strip 10. The length L of the paper strips 10 and 20 can be appropriately set to a value in accordance with the size of a container (cup, water bottle, and the like) containing the beverage, preferably a value in a range of 5 cm to 30 cm, and more preferably a value in a range of 10 cm to 25 cm. Both of the width (size obtained by subtracting the width of the two flange portions 12 from the width W) of the linear recessed portion 11 of the paper strip 10 and a height H of the linear recessed portion 11 of the paper strip 10 can be set to appropriate values in accordance with the type of beverage, preferably a value in a range of 1 mm to 20 mm, and more preferably a value in a range of 3 mm to 15 mm.

The paper strips 10 and 20 are both made of cup base paper. Here, the straw 1 using cup base paper having a basis weight of 70 g/$m^2$ and the straw 1 using cup base paper having a basis weight of 120 g/$m^2$ as the materials of the paper strips 10 and 20 have been manufactured as an example. The cup base paper is a base paper suitable for food containers such as paper cups and paper plates, and is excellent in water resistance and hygiene. Paper cups and paper plates are usually made of cup base paper having a basis weight of about 150 g/$m^2$ to 400 g/$m^2$, but in the present embodiment, cup base paper having a basis weight smaller (i.e., thinner) than these is used. However, the basis weight of the cup base paper used as the material of the straw 1 is not limited to the above-described example, and can be appropriately set to a value in accordance with the size of the straw 1, preferably a value in a range of 50 $g/m^2$ to 500 $g/m^2$, and more preferably a value in a range of 70 $g/m^2$ to 250 $g/m^2$. In the present embodiment, the cup base paper is used as the material of the straw 1, but paper other than the cup base paper may be used as the material.

Next, a manufacturing procedure of the straw 1 will be described with reference to FIGS. 2 and 3.

Figure 2A:
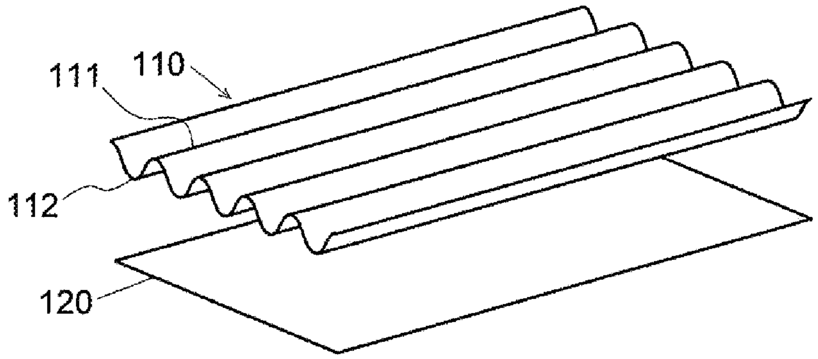
FIGS. 2A to 2C are views for explaining a manufacturing process of the straw according to the first embodiment.

First, a sheet material 110 (corresponding to the first sheet material of the present invention) having a corrugated shape and a sheet material 120 (corresponding to the second sheet material of the present invention) having a flat shape are prepared (FIG. 2A). Both the sheet material 110 and the sheet material 120 are made of cup base paper having a basis weight of 130 $g/m^2$. The sheet material 110 has a corrugated shape in which a plurality of straight linear crest portions and straight trough portions are alternately arranged. Hereinafter, for convenience of explanation, the convex upward part in FIG. 2 is called a trough portion 111, and the convex downward part is called a crest portion 112. In the sheet material 110, the interval (pitch) between the top portion of the crest portion 112 and the top portion of the crest portion 112 is the same as the width W of the straw 1 described above.

Figure 2B:
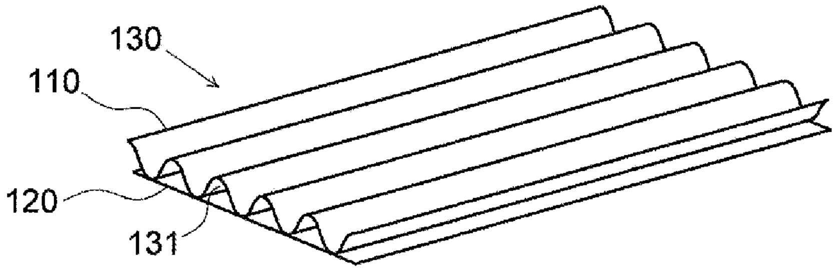
Figure 2C:
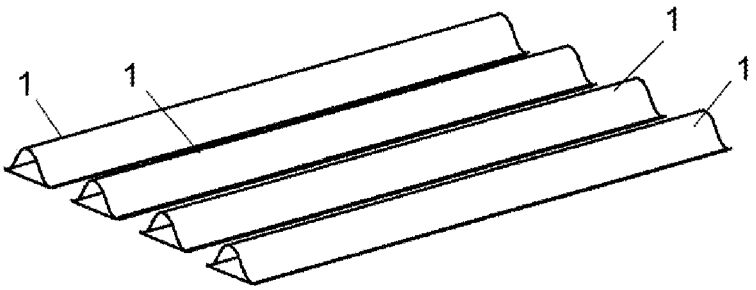

Next, a joined body 130 of the two sheet materials 110 and 120 is formed by overlapping the sheet material 110 on the sheet material 120, and applying thermocompression bonding to the crest portion 112 of the sheet material 110 and the sheet material 120 with a heat sealer (FIG. 2B). At this time, as shown in FIG. 3, the two sheet materials 110 and 120 are joined to each other in a region 132 having a predetermined width including the top portion of the crest portion 112 of the sheet material 110. The width of the region 132 is, for example, about 1/10 to 1/5 of the width W. As described above, the joined body 130 has a closed space 131 (four closed spaces 131 in FIG. 2B) surrounded by the trough portion 111 of the sheet material 110 and the sheet material 120.

Subsequently, the joined body 130 is cut along a wiggly cutting line 133 in the region 132. The cutting line 133 is a gentle sine curve having a period extremely larger than the amplitude. This gives a plurality of straws 1 (four straws 1 in the example shown in FIGS. 2 and 3) including a part between the cutting line 133 and the cutting line 133 adjacent to each other of the joined body 130. That is, the trough portion 111 of the first sheet material 110 becomes the linear recessed portion 11 of the paper strip 10 of the straw 1, and a part of the crest portion 112 of the first sheet material 110 becomes the flange portion 12 of the paper strip 10 of the straw 1. A part of the second sheet material 120 becomes the paper strip 20.

In the present embodiment, the cut surfaces of both sides of the straw 1 become curved surfaces due to the cutting line 133 that is made wiggly, and hence the fingers and the inside of the mouth are hardly damaged by the cut surfaces. Parts of the joined body 130 outside the cutting lines 133 on both sides in the width direction are discarded.

The plurality of straws 1 are obtained at a time by joining the two sheet materials 110 and 120 and cutting them along the cutting line 133. Therefore, it is possible to reduce the manufacturing cost and the material cost because the labor required for manufacturing is reduced and the amount of paper constituting the straw 1 can be reduced.

Furthermore, since the straw 1 includes the paper strip 10 having the linear recessed portion 11 having a crest-shaped cross section and the paper strip 20 having a flat shape, the width of the paper strip 10 does not expand equal to or wider than the width of the paper strip 20. Therefore, the cross-sectional shape of the paper strip 10 is maintained, and the inner space (closed space) of the straw 1 is prevented from flattening.

Second Embodiment

Figure 4:
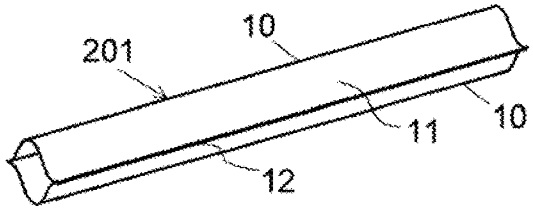
FIG. 4 is a perspective view of a straw according to a second embodiment of the present invention.

Next, a straw and a manufacturing method of the straw according to the second embodiment of the present invention will be described with reference to FIGS. 4 to 6. The same or corresponding parts as those in the first embodiment are denoted by the same reference numerals and description will be omitted as appropriate.

The present embodiment is different from the straw 1 according to the first embodiment in that a straw 201 is configured by combining two of the paper strips 10 shown in the first embodiment. That is, the straw 201 according to the present embodiment is formed by joining the two paper strips 10 of the same shape to each other at the flange portion 12. In the present embodiment, one paper strip 10 becomes the first member and the other paper strip 10 becomes the second member.

The straw 201 is manufactured by the following procedure.

Figure 5A:
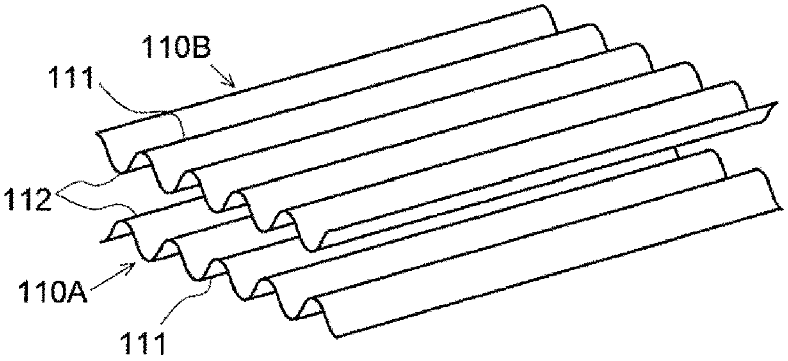
FIGS. 5A to 5C are views for explaining a manufacturing process of the straw according to the second embodiment.
Figure 5B:
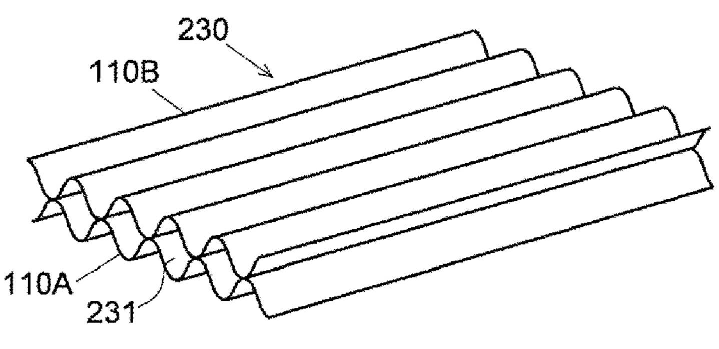
Figure 5C:
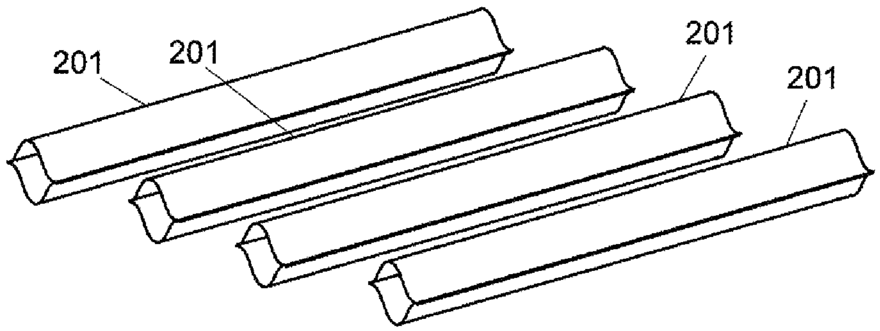
Figure 6:
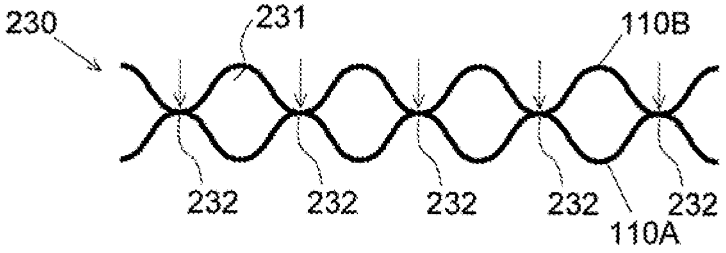
FIG. 6 is a schematic view of the joined body.

First, as shown in FIG. 5, the two sheet materials 110 having a corrugated shape are prepared. In the present embodiment, one of the two sheet materials 110 corresponds to the first sheet material and the other sheet material 110 corresponds to the second sheet material. Hereinafter, for convenience of explanation, the lower sheet material 110 is called a sheet material 110A and the upper sheet material 110 is called a sheet material 110B in FIG. 5.

Next, a joined body 230 of the two sheet materials 110A and 110B is formed by overlapping the sheet material 110A and the sheet material 110B so that the crest portions 112 face each other, and applying thermocompression bonding to the top portions of the crest portions 112 with a heat sealer (FIG. 5B). At this time, the two sheet materials 110A and 110B are joined to each other in a region 232 (see FIG. 6) having a predetermined width including the top portion of the crest portion 112 of the sheet material 110A. The width of the region 232 is, for example, about 1/10 to 1/5 of the width W, similarly to the width of the region 132 of the first embodiment. As described above, the joined body 230 has a closed space 231 surrounded by the trough portion 111 of the sheet material 110A and the trough portion 111 of the sheet material 110B.

Subsequently, the part indicated by an arrow in FIG. 6 in the region 232 of the joined body 230 is cut along a wiggly cutting line (not illustrated). Similarly to the cutting line 133, this cutting line is also a gentle sine curve having a period extremely larger than the amplitude. This gives a plurality of straws 201 (four straws 201 in the example shown in FIGS. 5 and 6) including a part between the cutting line and the cutting line adjacent to each other of the joined body 230. Parts of the joined body 230 outside the cutting lines on both sides in the width direction are discarded.

In the present embodiment, since the straw 201 is formed by using the sheet materials 110A and 110B having a corrugated shape, the cross-sectional shape of the straw 201 can be brought close to a circular shape.

Third Embodiment

Figure 7:
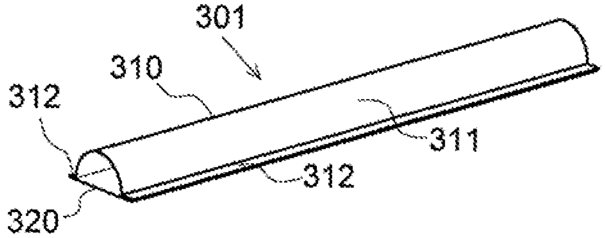
FIG. 7 is a perspective view of a straw according to a third embodiment of the present invention.
Figure 8A:
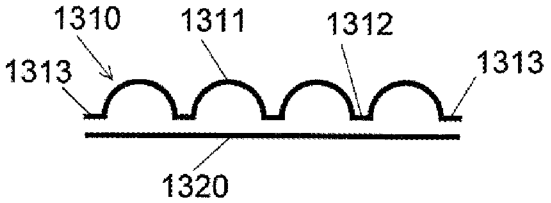
FIGS. 8A and 8B are views for explaining a manufacturing process of the straw according to the third embodiment.
Figure 8B:
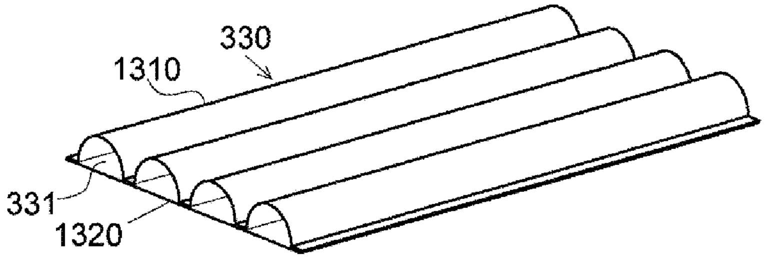

A straw and a manufacturing method of the straw according to the third embodiment of the present invention will be described with reference to FIGS. 7 and 8. Description will be omitted as appropriate regarding the same or corresponding parts as those in the first embodiment.

In this embodiment, a straw 301 includes an elongated paper strip 310 having a linear recessed portion 311 having a semicircular cross section and flange portions 312 on both sides of the linear recessed portion 311, and an elongated paper strip 320 having a flat shape. The paper strip 320 is the same as the paper strip 20 shown in the first embodiment. The paper strip 310 and the paper strip 320 correspond to the first member and the second member of the present invention. The length and width of the paper strip 310 are the same as those of the paper strip 320, and the both paper strips 310 and 320 are joined at the flange portion 312 of the paper strip 310.

A manufacturing procedure of the straw 301 will be described with reference to FIG. 8.

First, a sheet material 1310 (corresponding to the first sheet material of the present invention) having a plurality of linear recessed portions 1311 having a semicircular cross section arranged in parallel and a sheet material 1320 (corresponding to the second sheet material of the present invention) having a flat shape are prepared. The linear recessed portion 1311 and the linear recessed portion 1311 adjacent to each other of the sheet material 1310 are coupled by a coupling portion 1312 formed of a flat surface, and flange portions 1313 each formed of a flat surface are provided outside the linear recessed portions 1311 on both sides of the sheet material 1310. In the present embodiment, the linear recessed portion 1311 corresponds to the trough portion of the present invention, and the coupling portion 1312 and the flange portion 1313 correspond to the crest portion of the present invention.

Next, a joined body 330 of the two sheet materials 1310 and 1320 is formed by overlapping the sheet material 1310 on the sheet material 1320, and applying thermocompression bonding to the coupling portion 1312 and the flange portion 1313 of the sheet material 1310 and the sheet material 1320 with a heat sealer. Thus, the joined body 330 has four closed spaces 331 surrounded by the linear recessed portion 1311 of the sheet material 1310 and the sheet material 1320.

Subsequently, the joined body 330 is cut along a wiggly cutting line (not illustrated) at the coupling portion 1312 of the sheet material 1310. This gives a plurality of straws 301 (four straws 301 in the example shown in FIG. 8) including a part between the cutting line and the cutting line adjacent to each other of the joined body 330 and between the cutting line and the flange portion 1313.

Fourth Embodiment

Figure 9:
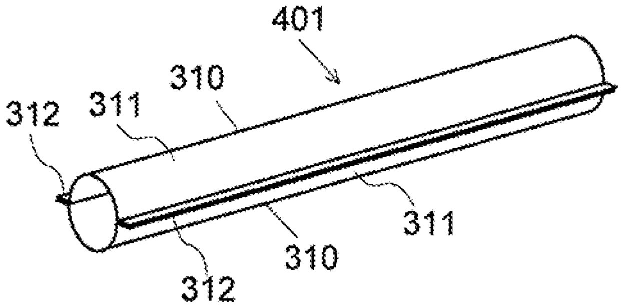
FIG. 9 is a perspective view of a straw according to a fourth embodiment of the present invention.
Figure 10A:
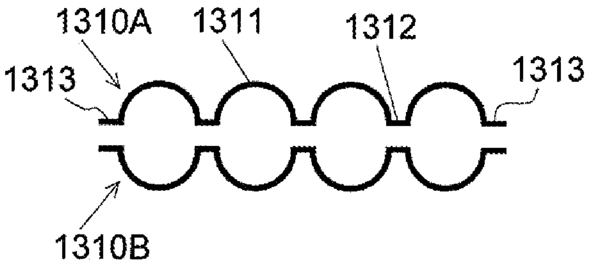
FIGS. 10A and 10B are views for explaining a manufacturing process of the straw according to the fourth embodiment.
Figure 10B:
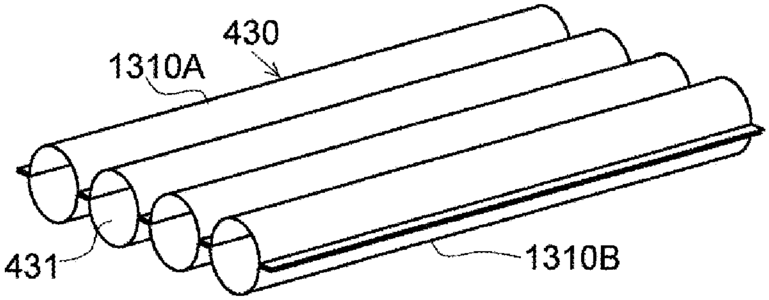

A straw and a manufacturing method of the straw according to the fourth embodiment of the present invention will be described with reference to FIGS. 9 and 10. The same or corresponding parts as those in the third embodiment are denoted by the same reference numerals and description will be omitted as appropriate.

In this embodiment, a straw 401 is configured by combining two of the paper strips 310 shown in the third embodiment. The straw 401 according to the present embodiment is formed by joining the two paper strips 310 of the same shape to each other at the respective flange portions 312. In the present embodiment, one paper strip 310 becomes the first member and the other paper strip 310 becomes the second member.

A manufacturing procedure of the straw 401 will be described with reference to FIG. 10.

First, two sheet materials 1310A and 1310B are prepared. The sheet materials 1310A and 1310B correspond to the first sheet material and the second sheet material of the present invention, and both have the same shape and size as those of the sheet material 1310 shown in the third embodiment.

Next, a joined body 430 of the two sheet materials 1310A and 1310B is formed by overlapping the sheet material 1310A and the sheet material 1310B so that the coupling portion 1312 and the flange portion 1313 face each other, and applying thermocompression bonding to the coupling portions 1312 to each other and the flange portions 1313 to each other with a heat sealer. Thus, the joined body 430 has a closed space 431 surrounded by the linear recessed portion 1311 of the sheet material 1310A and the linear recessed portion 1311 of the sheet material 1310B.

Subsequently, the joined body 430 is cut along a wiggly cutting line (not illustrated) at the coupling portions 1312 of the sheet materials 1310A and 1310B. This gives a plurality of straws 401 (four straws 401 in the example shown in FIG. 10) including a part between the cutting line and the cutting line adjacent to each other of the joined body 430 and between the cutting line and the flange portion 1313.

Fifth Embodiment

Figure 11:
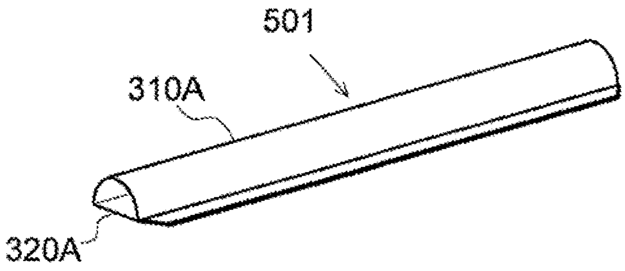
FIG. 11 is a perspective view of a straw according to a fifth embodiment of the present invention.
Figure 12:
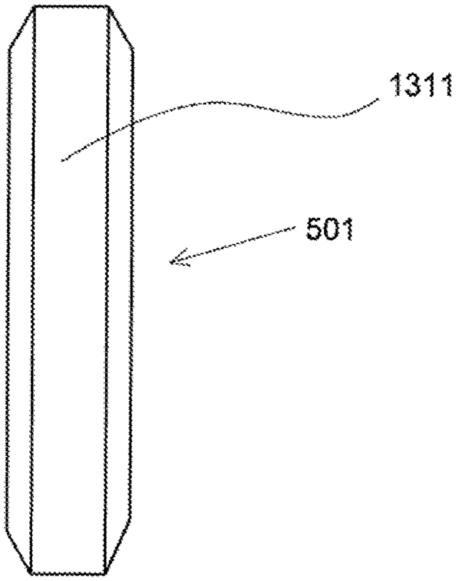
FIG. 12 is a plan view of the straw according to the fifth embodiment.
Figure 13:
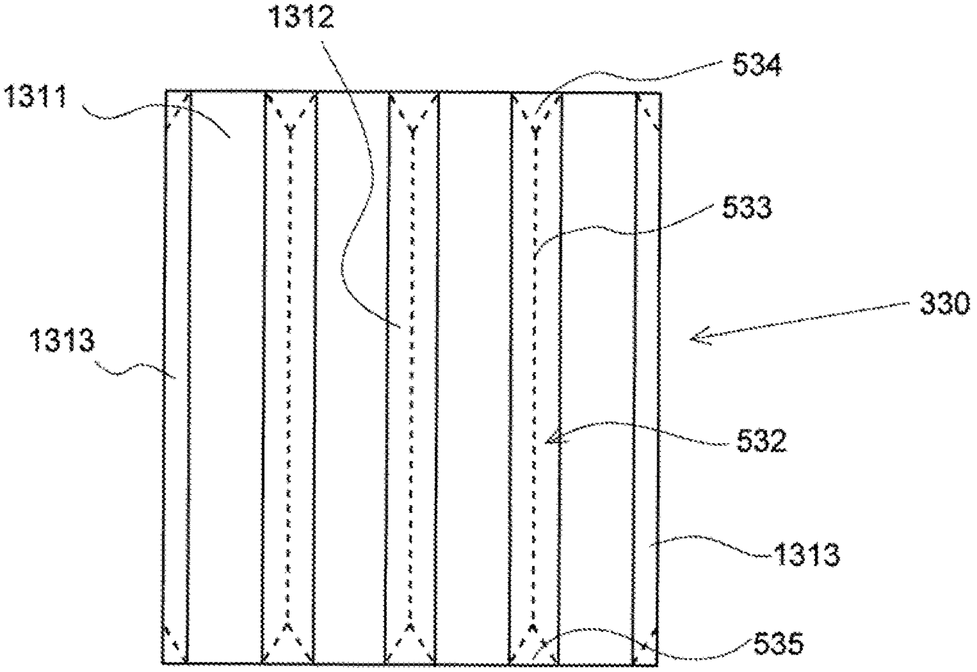
FIG. 13 is a view for explaining a manufacturing process of the straw according to the fifth embodiment.

A straw and a manufacturing method of the straw according to the fifth embodiment of the present invention will be described with reference to FIGS. 11 to 13. The same or corresponding parts as those in the third embodiment are denoted by the same reference numerals and description will be omitted as appropriate.

In this embodiment, a straw 501 includes a paper strip 310A and a paper strip 320A. The paper strip 310A and the paper strip 320A correspond to the first member and the second member of the present invention. The paper strip 310A and the paper strip 320A have the same length and width as those of the paper strip 310 and the paper strip 320 of the third embodiment, and have a shape in which corners of both sides are cut off at both longitudinal ends of the paper strip 310A and the paper strip 320A as shown in FIGS. 11 and 12.

A manufacturing procedure of the straw 501 will be described with reference to FIG. 13.

First, two of the sheet materials 1310 and 1320 are prepared.

Next, the joined body 330 of the sheet material 1320 and the sheet material 1310 is formed in the same procedure as in the third embodiment.

Subsequently, the joined body 330 is cut along a cutting line 532 having a straight line portion 533 connecting the center in the width direction of each coupling portion 1312 of the sheet material 1310 and the sheet material 1320, and biforked Y-shaped parts at both ends, i.e., a Y-shaped portion 534 and a Y-shaped portion 535 (parts indicated by broken line in FIG. 13). At this time, the four points at the tip ends of the Y-shaped portion 534 and the Y-shaped portion 535, i.e., the tip ends of the cutting line 532, coincide with the four respective vertices of the coupling portion 1312 having a rectangular shape. This gives a plurality of straws 501 (four straws 501 in the example shown in FIG. 13) including a part between the cutting line and the cutting line adjacent to each other of the joined body 330 and between the cutting line and the flange portion 1313. Since the both ends of the cutting line 532 are Y-shaped, the both end portions of the straw 501 have a trapezoidal shape in top view as shown in FIG. 12.

In the present embodiment, since there are no corners at both ends of the straw 501, the mouth and the fingers are hardly damaged by the tip end of the straw.

Sixth Embodiment

Figure 14:
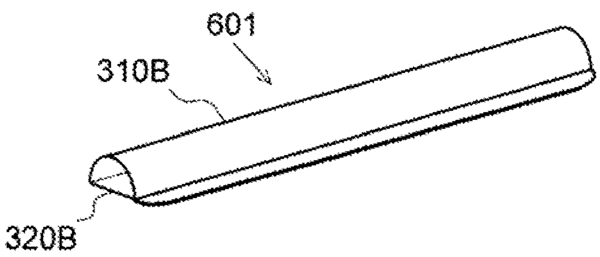
FIG. 14 is a perspective view of a straw according to a sixth embodiment of the present invention.
Figure 15:
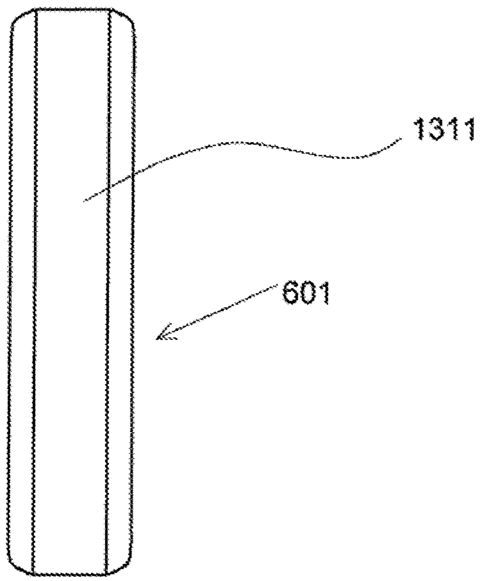
FIG. 15 is a plan view of the straw according to the sixth embodiment.
Figure 16:
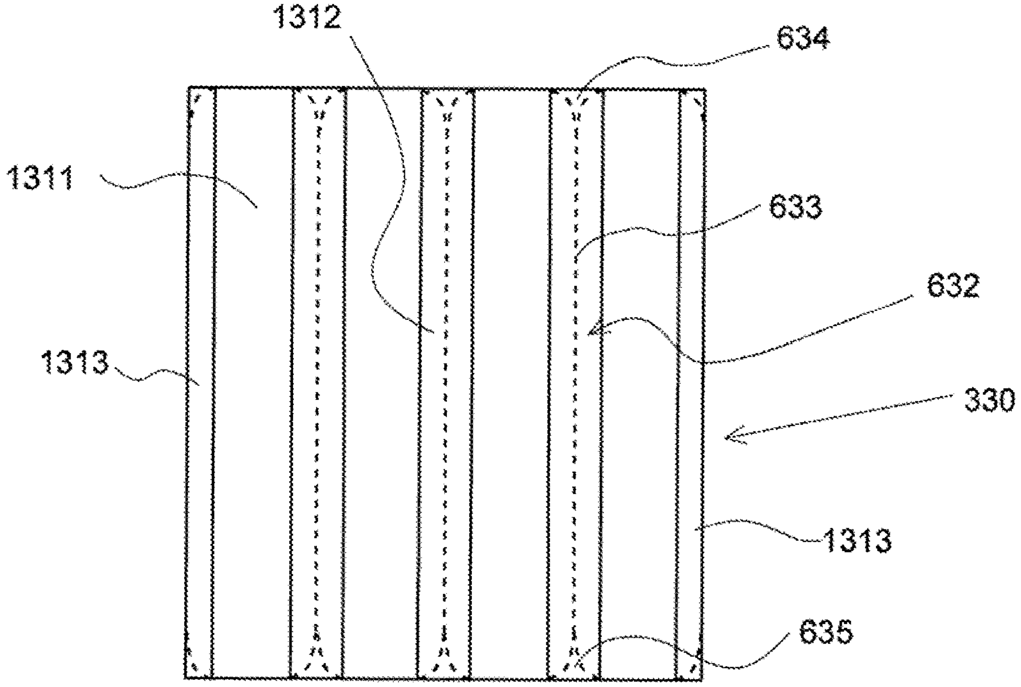
FIG. 16 is a view for explaining a manufacturing process of the straw according to the sixth embodiment.

A straw and a manufacturing method of the straw according to the sixth embodiment of the present invention will be described with reference to FIGS. 14 to 16. The same or corresponding parts as those in the third embodiment are denoted by the same reference numerals and description will be omitted as appropriate.

In this embodiment, a straw 601 includes a paper strip 310B and a paper strip 320B. The paper strip 310B and the paper strip 320B correspond to the first member and the second member of the present invention. The paper strip 310B and the paper strip 320B have the same length and width as those of the paper strip 310 and the paper strip 320 of the third embodiment, and have a shape in which corners of both sides are cut off at both longitudinal ends of the paper strip 310B and the paper strip 320B as shown in FIGS. 14 and 15.

A manufacturing procedure of the straw 601 will be described with reference to FIG. 16.

First, two of the sheet materials 1310 and 1320 shown in the third embodiment are prepared.

Next, the joined body 330 of the sheet material 1320 and the sheet material 1310 is formed in the same procedure as in the third embodiment.

Subsequently, the joined body 330 is cut along a cutting line 632 having a straight line portion 633 connecting the center in the width direction of each coupling portion 1312 of the sheet materials 1310 and 1320, and biforked Y-shaped parts at both ends, i.e., a Y-shaped portion 634 and a Y-shaped portion 635. The Y-shaped portion 634 and the Y-shaped portion 635 have a shape in which a convex curve is drawn outward with respect to the straight line portion 633. At this time, the four points at the tip ends of the Y-shaped portion 634 and the Y-shaped portion 635, i.e., the tip ends of the cutting line 632, coincide with the four respective vertices of the coupling portion 1312 having a rectangular shape. This gives a plurality of straws 601 (four straws 601 in the example shown in FIG. 16) including a part between the cutting line and the cutting line adjacent to each other of the joined body 330 and between the cutting line and the flange portion 1313. Both side corner portions of the both end portions of the straw 601 have a convex curve shape as shown in FIG. 15.

In the present embodiment, since there are no corners at both ends of the straw, the mouth and the fingers are hardly damaged by the tip end of the straw.

Seventh Embodiment

Figure 17:
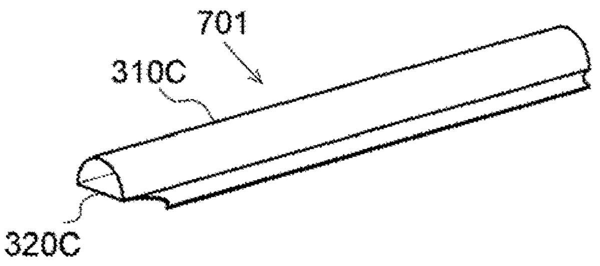
FIG. 17 is a perspective view of a straw according to a seventh embodiment of the present invention.
Figure 18:
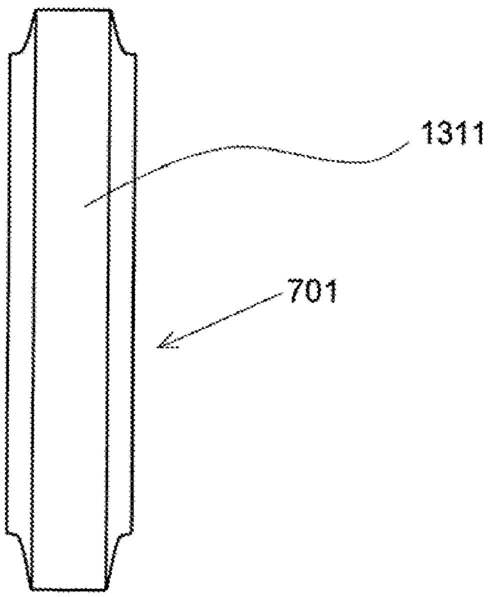
FIG. 18 is a plan view of the straw according to the seventh embodiment.
Figure 19:
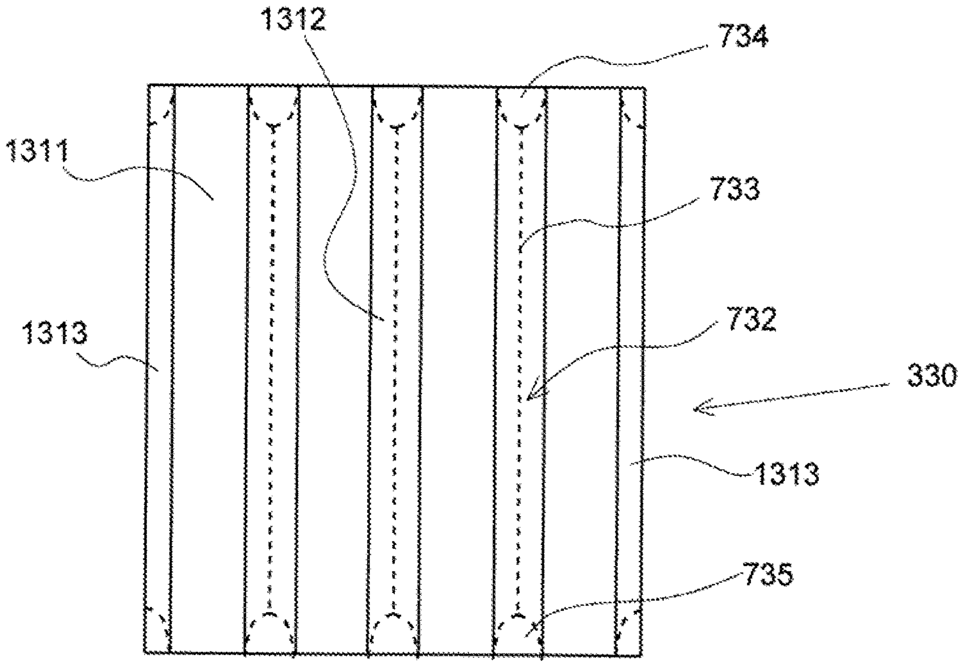
FIG. 19 is a view for explaining a manufacturing process of the straw according to the seventh embodiment.

A straw and a manufacturing method of the straw according to the seventh embodiment of the present invention will be described with reference to FIGS. 17 to 19. The same or corresponding parts as those in the third embodiment are denoted by the same reference numerals and description will be omitted as appropriate.

In this embodiment, a straw 701 includes a paper strip 310C and a paper strip 320C. The paper strip 310C and the paper strip 320C correspond to the first member and the second member of the present invention. The paper strip 310C and the paper strip 320C have the same length and width as those of the paper strip 310 and the paper strip 320 of the third embodiment, and have a shape in which corners of both sides are cut off at both longitudinal ends of the paper strip 310C and the paper strip 320C as shown in FIGS. 17 and 18.

A manufacturing procedure of the straw 701 will be described with reference to FIG. 19.

First, two of the sheet materials 1310 and 1320 are prepared.

Next, the joined body 330 of the sheet material 1320 and the sheet material 1310 is formed in the same procedure as in the third embodiment.

Subsequently, as in FIG. 19, the joined body 330 is cut along a cutting line 732 having a straight line portion 733 connecting the center in the width direction of each coupling portion 1312 of the sheet materials 1310 and 1320, and biforked Y-shaped parts at both ends, i.e., a Y-shaped portion 734 and a Y-shaped portion 735. The Y-shaped portion 734 and the Y-shaped portion 735 have a shape in which a convex curve is drawn inward with respect to the straight line portion 733. At this time, the four points at the tip ends of the Y-shaped portion 734 and the Y-shaped portion 735, i.e., the tip ends of the cutting line 732, coincide with the four respective vertices of the coupling portion 1312 having a rectangular shape. This gives a plurality of straws 701 (four straws 701 in the example shown in FIG. 19) including a part between the cutting line and the cutting line adjacent to each other of the joined body 330 and between the cutting line and the flange portion 1313. Both side corner portions of the both end portions of the straw 701 have a concave curve shape as shown in FIG. 18.

In the present embodiment, since there are no corners at both ends of the straw, the mouth and the fingers are hardly damaged by the tip end of the straw.

Eighth Embodiment

A straw manufacturing apparatus used for manufacturing the straw according to the present invention will be described with reference to FIGS. 20A, 20B, and 21. A straw manufacturing apparatus 800 is used for manufacturing a straw (i.e., the straws of the first, third, and fifth to seventh embodiments) including the first paper strip having a linear recessed portion having a crest-shaped or semicircular cross section and the second paper strip having a flat shape.

Figure 20A:
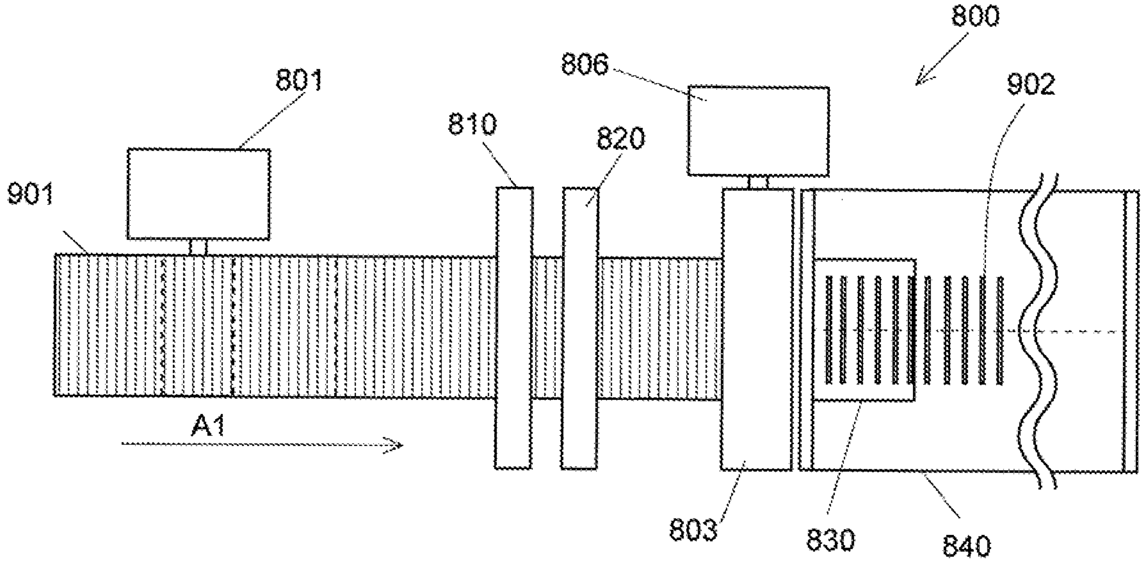
FIG. 20A is a top view showing a schematic configuration of a straw manufacturing apparatus according to an eighth embodiment.
Figure 20B:
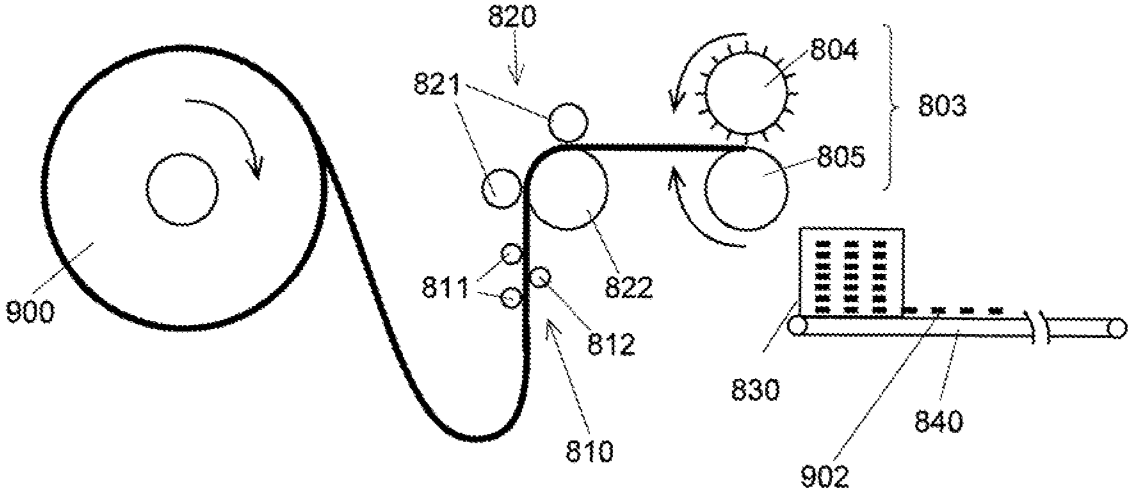
FIG. 20B is a side view showing a schematic configuration of the straw manufacturing apparatus according to the eighth embodiment.

FIG. 20A is a top view showing the schematic configuration of the straw manufacturing apparatus 800, and FIG. 20B is a side view. The straw manufacturing apparatus 800 has: a driving unit 801 that rotates, in the direction of an arrow A1, a single stage roll 900 around which a long single side cardboard sheet 901 is wound; a cutting unit 803 that cuts, at a predetermined part, the single side cardboard sheet 901 drawn out from the single stage roll 900; a tension unit 810 and a guide unit 820 that are arranged between the single stage roll 900 and the cutting unit 803; a stacker 830 that houses a straw formed by cutting the single side cardboard sheet 901 by the cutting unit 803; and a conveyor unit 840 that sequentially conveys straws housed in the stacker 830.

The cutting unit 803 includes a blade roller 804, a sprocket roller 805, and a driving unit 806 that synchronously rotates the blade roller 804 and the sprocket roller 805. The blade roller 804 includes a cylindrical portion 8041 and a plurality of cutting blades 8042 attached at predetermined intervals to the outer peripheral surface of the cylindrical portion 8041. The cutting blade 8042 has a length substantially equal to the axial length of the cylindrical portion 8041, and is erected in the radial direction of the cylindrical portion 8041 along the axial direction of the cylindrical portion 8041.

The sprocket roller 805 has a plurality of axially long protruding portions 8051 provided at predetermined intervals on the outer peripheral surface of the sprocket roller 805. The same number of the cutting blades 8042 of the blade roller 804 and the protruding portions 8051 of the sprocket roller 805 are provided, and the both rollers 804 and 805 are rotated by the driving unit 806 so that the tip end of the cutting blade 8042 positioned at the lowermost part of the blade roller 804 abuts against the top portion of the protruding portion 8051 positioned at the uppermost part of the sprocket roller 805.

Inside the sprocket roller 805, an air passage 8053 is formed along a part (hereinafter called linear recessed portion 8052) between the protruding portion 8051 and the protruding portion 8051. One or a plurality of discharge ports are formed in the linear recessed portion 8052, and air sent from an air supply device not illustrated to the air passage 8053 is discharged through the discharge port. The air supply device supplies air to the air passage 8053 passing near the stacker 830 and does not supply air to another air passage 8053.

The tension unit 810 includes two first tension rollers 811 and one second tension roller 812. The guide unit 820 includes two guide crimping rollers 821 and one guide roller 822.

The single stage roll 900, the guide roller 822, and the sprocket roller 805 are arranged so that their respective rotation centers are positioned on the same horizontal plane, and the tension unit 810 is arranged so as to be positioned below the horizontal plane. In the above arrangement, the single side cardboard sheet 901 wound around the single stage roll 900 is drawn out from the single stage roll 900 so that the corrugated side faces downward. At this time, the single side cardboard sheet 901 passes upward from the bottom between the first tension roller and the second tension roller of the tension unit 810 in a slack state, and is then fed to the cutting unit 803 through between the guide crimping roller and the guide roller.

Figure 21:
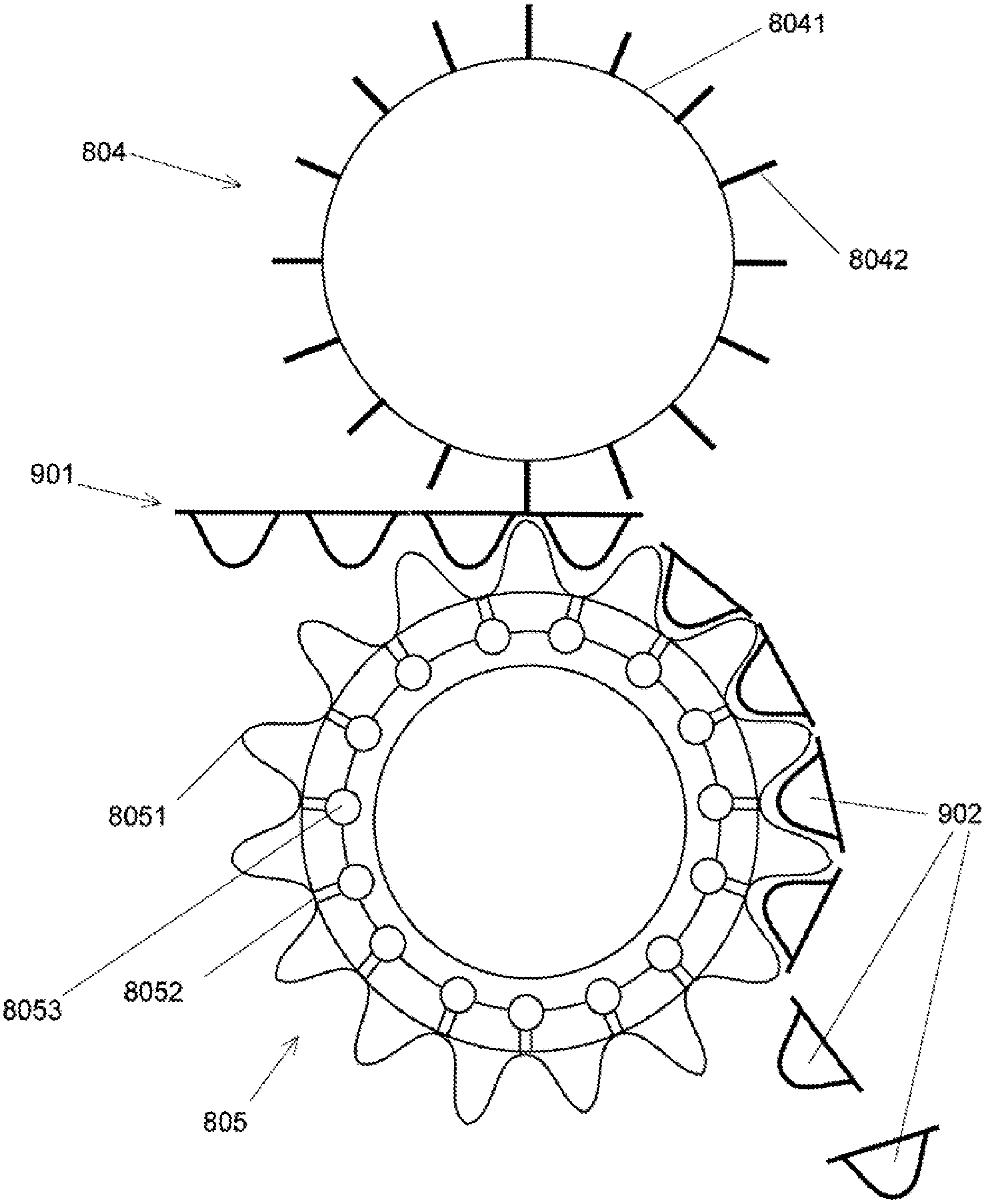
FIG. 21 is a side view showing a schematic configuration of a cutting unit according to the eighth embodiment.

In FIG. 21, the cross section of the corrugated portion of the single side cardboard sheet 901 is supposed to have a bell shape for convenience, but the cross section may have a semicircular shape. That is, the single side cardboard sheet 901 used in the straw manufacturing apparatus 800 includes not only a corrugated sheet having the crest of a bell-shaped cross section but also that of a semicircular cross section.

The single side cardboard sheet 901 fed to the cutting unit 803 passes between the sprocket roller 805 and the blade roller 804 in a state where the crest portion of the corrugated sheet is fitted in the linear recessed portion 8052 of the sprocket roller 805. When passing between the cutting blade 8042 positioned at the lowermost part of the blade roller 804 and the protruding portion 8051 positioned at the uppermost part of the sprocket roller 805, the trough portion of the single side cardboard sheet 901 is cut by the cutting blade 8042.

A part (this becomes a straw 902) separated from the single side cardboard sheet 901 by being cut in the trough portion moves while being fitted in the linear recessed portion 8052 of the sprocket roller 805 for a while. Then, when the above-described part moves near the stacker 830, the straw 902 is blown out by air present in the sprocket roller 805 and discharged from an air passage 503 positioned near the stacker 830, and is housed in the stacker 830. The straws 902 housed in the stacker 830 are sequentially discharged and conveyed onto the conveyor unit 840 from an opening portion in a lower portion of the stacker 830.

Figure 3:
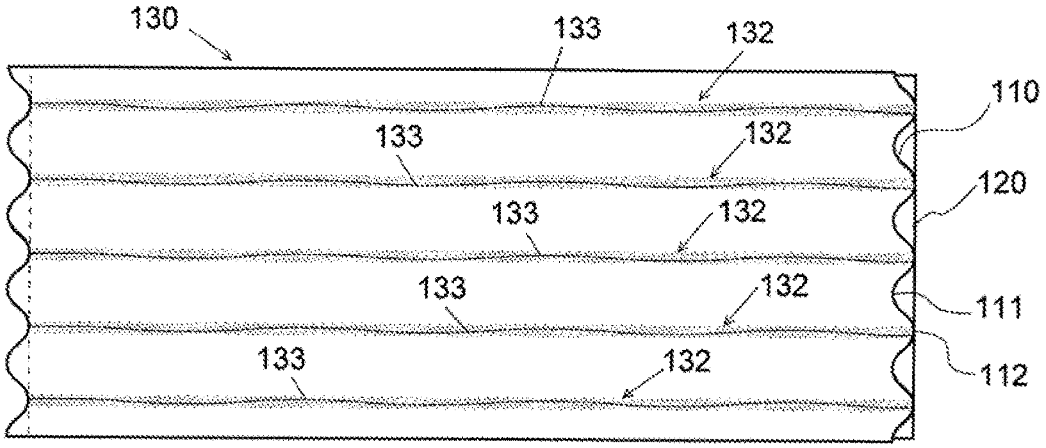
FIG. 3 is a schematic view of a joined body.

Here, in a case of using the cutting blade 8042 having a wiggly tip end shape as shown by the cutting line 133 in FIG. 3, the part separated from the single side cardboard sheet 901 becomes the straw of the first embodiment and the third embodiment, whereas in a case of using the cutting blade 8042 having a tip end shape including a straight line portion and Y-shaped portions on both sides of the straight line portion, the part separated from the single side cardboard sheet 901 becomes the straw of the fifth to seventh embodiments.

Use of the straw manufacturing apparatus 800 having the above configuration enables mass production of the straw 902 from the long single side cardboard sheet 901.

The present invention is not limited to the embodiments described above, and appropriate modifications can be made within the scope of the gist of the present invention.

For example, the two sheet materials having the same shape are used in the second and fourth embodiments, but the depth and cross-sectional shape of the linear recessed portions may be different as long as the widths of the linear recessed portion of one sheet material and the linear recessed portion of the other sheet material are the same and the widths of the protruding portion of one sheet material and the protruding portion of the other sheet material are the same. For example, the cross-sectional shape of the linear recessed portion of the sheet material may be a rectangular shape, a V-shape, and the like in addition to a crest shape or a semicircular shape.

In the first to seventh embodiments described above, the first and second sheet materials are joined by applying thermocompression bonding with a heat sealer, but they may be joined with an adhesive.

In the above-mentioned first to seventh embodiments, the joined body of the first and second sheet materials gives the four straws, but the first and second sheet materials may be configured so as to give five or more straws, or the first and second sheet materials may be configured so as to give two or three straws.

In the first to seventh embodiments described above, the sheet material having the same length as the length of the straw is used, but a sheet material longer than the straw may be used. In this case, one end portion in the length direction is cut after the joined body is formed.

In the first to seventh embodiments described above, in order to impart water resistance to the straws, a joined body of two sheet materials may be formed by subjecting one side of the first sheet material and one side of the second sheet material to polyethylene laminate processing, overlapping the processed surfaces on each other, and thermally welding at a temperature near the melting point of polyethylene.

In the fifth to seventh embodiments described above, the cutting line may protrude from the coupling portion to the linear recessed portion.

In the eighth embodiment described above, it is preferable to use a single side cardboard sheet having a larger adhesive width (length in the flow direction of the single side cardboard sheet) at the trough portions of the flat sheet and the corrugated sheet than that of a general single side cardboard sheet. Use of such a single side cardboard sheet can prevent the flat sheet and the corrugated sheet from being cut at a part where they are not adhered in a case where the cutting part by the cutting blade 8042 is shifted in the flow direction of the single side cardboard sheet.

In the above embodiments, paper having a low environmental load is used as the material of the straw. However, a straw having a low environmental load can be provided even in a case of using a sheet material made of, for example, grass or wood other than paper. The straw according to the present invention is preferably made of a material having a low environmental load, but can be made of plastic or the like.

REFERENCE SIGNS LIST

1, 201, 301, 401, 501, 601, 701, 902 . . . Straw
10, 20, 310, 310A, 310B, 310C, 320, 320A, 320B, 320C . . . Paper Strip
11, 311, 1311 . . . Linear Recessed Portion
12, 312, 1313 . . . Flange Portion
110, 110A, 110B, 120, 1310, 1310A, 1310B, 1320 . . . Sheet Material
111 . . . Trough Portion
112 . . . Crest Portion
1312 . . . Coupling Portion
133, 532, 632, 732 . . . Cutting Line
533, 633, 733 . . . Straight Line Portion of Cutting Line
534, 535, 634, 635, 734, 735 . . . Y-shaped Portion at Both Ends of Cutting Line
130, 230, 330, 430 . . . Joined Body
131, 231, 331, 431 . . . Closed Space
800 . . . Straw Manufacturing Apparatus

The invention claimed is:

1. A manufacturing method of a straw comprising:

overlapping a first sheet material in which a plurality of linear crest portions and a plurality of trough portions are alternately arranged and a second sheet material facing the first sheet material on a crest portion side of the first sheet material;

joining the first sheet material and the second sheet material at the plurality of linear crest portions of the first sheet material to form a plurality of closed spaces between the plurality of trough portions and the second sheet material; and cutting the first sheet material and the second sheet material at a plurality of joined parts along common sine-curved cutting lines to obtain a plurality of straws, wherein edges of the plurality of straws corresponding to the common sine-curved cutting lines are sine curves with multiple periods.

2. The manufacturing method of a straw according to claim 1, wherein the second sheet material has a plurality of linear crest portions and a plurality of trough portions arranged at a same pitch as that of the first sheet material, and the plurality of linear crest portions of the first sheet material and the plurality of linear crest portions of the second sheet material are joined.

3. The manufacturing method of a straw according to claim 1, wherein the second sheet material has a flat shape.

4. The manufacturing method of a straw according to claim 1, wherein a part where the first sheet material and the second sheet material are joined is cut along a cutting line including a straight line portion and a Y-shaped portion at one end or both ends of the straight line portion.

5. The manufacturing method of a straw according to claim 1, wherein the first sheet material and second sheet material are each made of cup base paper having a basis weight of 50 $g/m^2$ to 500 $g/m^2$.

6. A straw comprising:

a first member having a linear recessed portion and flange portions positioned on both sides of the linear recessed portion and extending along the linear recessed portion; and a second member that is shaped like a sheet facing the first member and joined at the flange portions of the first member, wherein edges of the flange portions and edges of the second member are common sine curves with multiple periods and overlap each other.

7. The straw according to claim 6, wherein the second member has a flat shape.

8. The straw according to claim 6, wherein the second member has a linear recessed portion and flange portions positioned on both sides of the linear recessed portion and extending along the linear recessed portion, and the flange portions of the second member are joined to a flange of the first member.

9. The straw according to claim 6, wherein both longitudinal end portions or one end portion of a part where the first member and the second member are joined has a shape in which a corner is cut off.

10. The straw according to claim 6, wherein the first member and the second member are each made of cup base paper having a basis weight of 50 $g/m^2$ to 500 $g/m^2$.

* * * * *